United States Patent [19]
Harris

[11] Patent Number: 5,105,850
[45] Date of Patent: Apr. 21, 1992

[54] FLUID FUSE VALVE

[76] Inventor: David M. Harris, 455 Cabrillo, Costa Mesa, Calif. 92627

[21] Appl. No.: 733,880

[22] Filed: Jul. 22, 1991

[51] Int. Cl.$^5$ .............................................. F16K 17/30
[52] U.S. Cl. .................... 137/513.3; 137/517
[58] Field of Search ............... 137/513.3, 513.5, 517, 137/460

[56] References Cited

U.S. PATENT DOCUMENTS

| | | | |
|---|---|---|---|
| 310,338 | 1/1885 | Venson | 137/517 |
| 1,778,247 | 10/1930 | Denton | 137/517 |
| 1,956,010 | 4/1934 | Diescher | 137/153 |
| 2,635,629 | 4/1953 | Asaro | 137/517 |
| 2,656,850 | 10/1953 | Garretson | 137/460 |
| 3,106,226 | 10/1963 | Machen | 137/517 X |
| 3,177,890 | 4/1965 | Rosenberg | 137/460 |
| 3,183,928 | 5/1965 | Rosenberg | 137/460 |
| 3,481,362 | 12/1969 | Dollison | 137/460 |
| 3,628,562 | 12/1971 | Bruins | 137/460 X |
| 3,794,077 | 2/1974 | Fanshier | 137/517 X |
| 3,820,565 | 6/1974 | Durbin | 137/517 X |
| 4,188,971 | 2/1980 | Otteson | 137/460 |
| 4,436,111 | 5/1984 | Gold et al. | 137/517 X |
| 4,465,093 | 8/1984 | Gold et al. | 137/498 |
| 4,699,166 | 10/1987 | Gold et al. | 137/2 |
| 4,727,903 | 3/1988 | Sturgis et al. | 137/461 |
| 4,736,889 | 4/1988 | Stephenson | 239/204 |
| 4,830,046 | 5/1989 | Holt | 137/517 X |
| 4,958,657 | 9/1990 | Hagan et al. | 137/517 |

FOREIGN PATENT DOCUMENTS

| | | | |
|---|---|---|---|
| 2307285 | 9/1974 | Fed. Rep. of Germany | 137/517 |
| 2124901 | 9/1972 | France | |

*Primary Examiner*—John Rivell
*Attorney, Agent, or Firm*—Lynn & Lynn

[57] ABSTRACT

A valve housing has an inlet bore configured for connection to a fluid supply pipe an outlet bore configured for connection to a fluid distribution pipe. A valve assembly mounted in the housing controls fluid flow between the inlet bore and the outlet bore. A valve seat is mounted in the housing, and a valve stem guide having a plurality of passages for permitting fluid flow therethrough are mounted in the housing. A hollow bolt shaft extends into the housing. A valve stem extends into the hollow bolt and through the valve stem guide and the valve seat. The valve stem guide and the hollow bolt cooperate to hold the valve stem in predetermined alignment relative to the fluid transmission bore. A plunger is mounted to the valve stem upstream from the valve seat. A stop is mounted on the valve stem to limit motion of the valve stem such that the first end of the valve stem is retained within the hollow portion of the adjusting bolt. A spring is retained between the end of the bolt shaft and the stop to bias the plunger away from the valve seat. The spring is arranged such that a predetermined fluid flow rate produces a force on the plunger sufficient to move it into contact with the valve seat and thereby shut off the fluid flow.

4 Claims, 2 Drawing Sheets

FLUID FUSE VALVE

BACKGROUND OF THE INVENTION

This invention relates generally to fluid flow control devices and particularly to fluid flow regulator valves. Still more particularly, this invention relates to a shutoff valve for stopping the flow of a fluid such as water when the pressure upstream of the valve exceeds a predetermined pressure or where a leak or broken pipe develops downstream from the valve, resulting in a large increase in the flow rate.

SUMMARY OF THE INVENTION

It is an object of the present invention to provide a fuse shut off valve for use in a fluid distribution system having a fluid supply pipe that carries fluid to the fuse valve and a fluid distribution pipe that carries fluid away from the fuse valve. A fuse valve according to the present invention is inexpensive to manufacture and service to replace worn or corroded parts. It is also an object of the invention to provide a fuse valve that is easy to install and use in a sprinkler system or the like. Another object of the invention is to provide a fuse valve that includes means for automatically relieving pressure in the fluid supply pipe after the break or rupture that caused the valve to close has been repaired or after an upstream valve has been closed.

Accordingly, a fuse valve according to the present invention includes a housing having an inlet bore configured for connection to the fluid supply pipe an outlet bore configured for connection to the fluid distribution pipe and a fluid transmission bore between the inlet bore and the outlet bore. The fuse valve also includes a valve assembly mounted in the housing to control fluid flow between the inlet bore and the outlet bore. The valve assembly includes a valve seat mounted in the housing between the inlet bore and the fluid transmission bore and a valve stem guide mounted in the housing. The valve stem guide has a plurality of passages for permitting fluid flow therethrough. The fuse valve may also include a plug mounted in the housing with an adjusting bolt mounted in a central bore in the plug. The adjusting bolt has a hollow shaft portion extending into the bolt from the end of the bolt distal from its head. A valve stem has a first end that extends into the hollow shaft portion of the bolt and a second end that extends through the valve stem guide and the valve seat. The valve stem guide has a passage aligned with the valve stem so that the valve stem guide and the hollow shaft portion cooperate to hold the valve stem in predetermined alignment relative to the fluid transmission bore. A plunger is mounted to the valve stem upstream from the valve seat. A stop is mounted on the valve stem to limit motion of the valve stem such that the first end of the valve stem is retained within the hollow portion of the adjusting bolt. A spring is retained between the end of the bolt shaft and the stop to bias the plunger away from the valve seat. The spring is arranged such that a predetermined fluid flow rate produces a force on the plunger sufficient to move it into contact with the valve seat and thereby shut off the fluid flow.

The fuse valve may further include an inlet housing and a fluid transmission housing threadedly engagable with the inlet housing. The fluid transmission housing may have a stepped bore portion for receiving the valve stem guide and the valve seat therein. The valve stem guide and the valve seat are arranged in the stepped bore so that the valve stem guide and the valve seat are retained in predetermined positions when the inlet housing and the fluid transmission are threadedly engaged. A spacer may be mounted in the stepped bore between the valve stem guide and the valve seat.

DESCRIPTION OF THE PREFERRED EMBODIMENT

Figure 1:
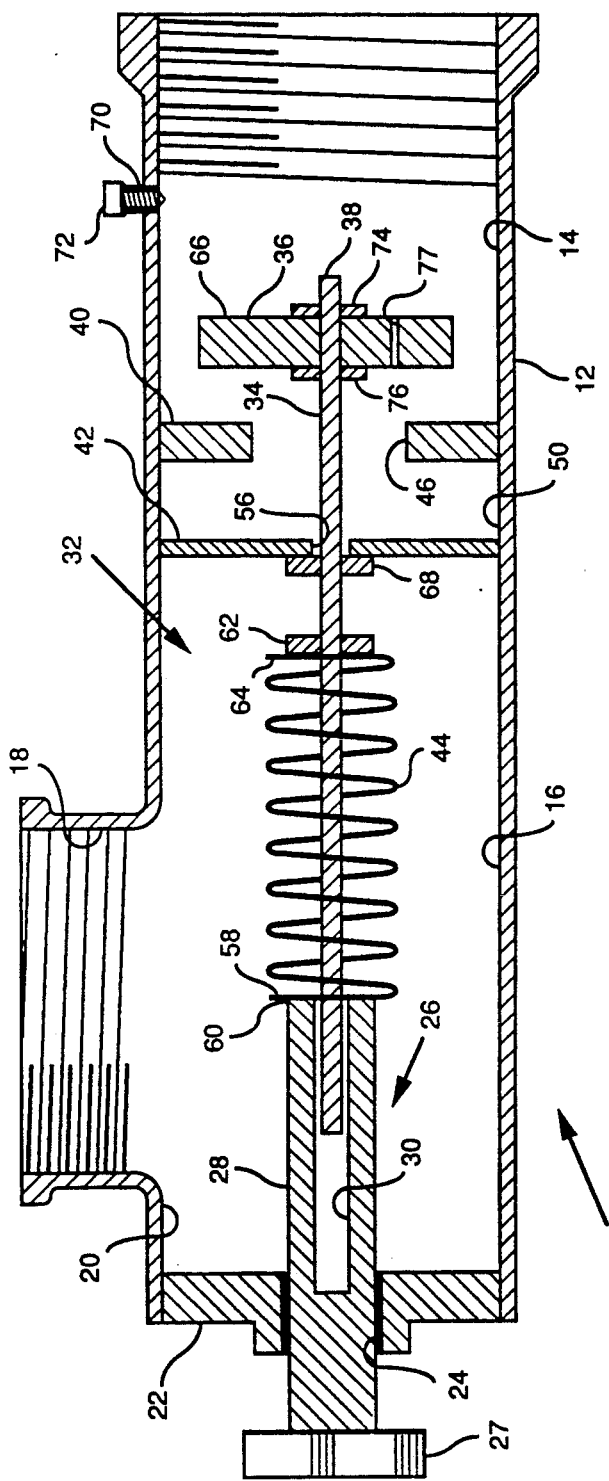
FIG. 1 is a partial cross sectional view of a first embodiment of a fuse valve according to the present invention.
Figure 2:
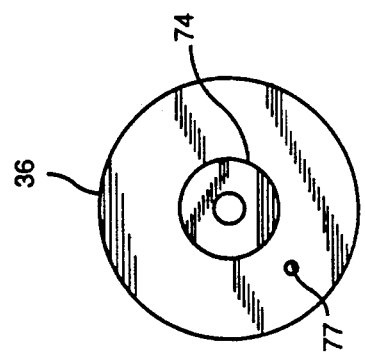
FIG. 2 is a plan view of a plunger assembly that may be included in the fuse valve of FIG. 1.
Figure 3:
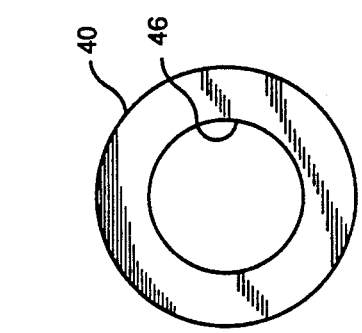
FIG. 3 is a plan view of a valve seat that may be included in the fuse valve of FIG. 1.
Figure 4:
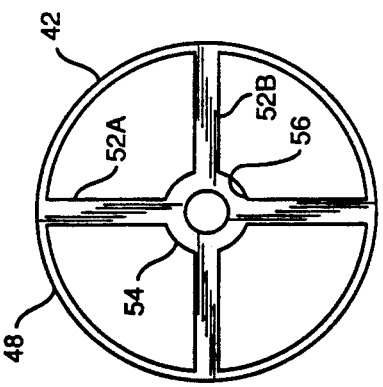
FIG. 4 is a plan view of a valve stem guide that may be included in the fuse valve of FIG. 1.
Figure 5:
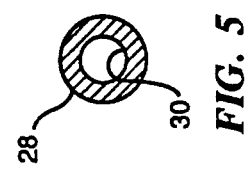
FIG. 5 is a plan view of an end of an adjusting bolt that may be included in the fuse valve of FIG. 1.

Referring to FIG. 1, a fuse valve 10 according to the present invention includes a housing 12, an inlet bore 14, a fluid transmission bore 16 and an outlet bore 18. The inlet bore 14 and the outlet bore 18 preferably are threaded to facilitate connecting the fuse valve 10 to inlet and outlet pipes (not shown).

The housing 12 further includes a bore 20 in which a plug 22 is mounted. The bore 20 and the plug 22 are preferably threadedly engaged so that the plug 22 may be removed from the bore 20. The plug 22 has a threaded bore 24 therein. An adjusting bolt 26 is threaded into the bore 24. The adjusting bolt 26 has a head 27 and a shaft 28 that extends from the head 28 into the fluid transmission bore 16. The shaft 28 preferably has an axial bore 30 that extends from the end of the shaft 28 distal from the head 27 to a point near the head 28 of the adjusting bolt 26.

A valve assembly 32 includes a valve stem 34, a plunger 36 mounted near an end 38 of the plunger, a valve seat 40, a valve guide 42 and a spring 44. The valve seat 40 is mounted in the housing 12 near the inlet bore 14. The valve seat 40 may be formed generally as a cylinder with a central bore 46 through which fluid flows when the valve assembly is in its open position.

The valve guide 42 is mounted in the housing 12 downstream from the valve seat 40. The valve guide 42 may be formed to comprise an outer ring 48 mounted to the inner wall 50 of the housing. A plurality of spokes 52A, 52B, etc. extends radially inward from the outer ring 48 to an inner ring 54. The inner ring 54 has a passage 56 having a diameter larger than that of the valve stem 34. When the valve guide 42 is mounted in the housing 12, the passage 56 and the bore 30 are generally coaxially aligned.

The valve stem 34 extends through the passage 56 into the bore 30 so that the valve stem 34 is slidable in an axial direction in the housing 12. In particular, the valve stem 34 has a range of axial motion such that the plunger 36 may be engaged with the valve seat 40. The spring 44 is mounted coaxially with the valve stem 34 so that an end 58 of the spring 44 is adjacent an end 60 of the adjusting bolt 26. A spring stop 62 is fixed to the valve stem 34 adjacent an end 64 of the spring 44 so that the spring 44 may be compressed between the spring stop 62 and the end 60 of the adjusting bolt 26.

The plunger 36 is spaced apart from the valve seat 40 during normal operation of the fuse valve 10 so that fluid may flow into the inlet bore 14, through the fluid transmission bore 16 and out of the fuse valve 10 through the outlet bore 18. However, as the fluid flow rate increases, fluid pressure on the upstream side 66 of the plunger 36 begins to move the plunger 36 toward the valve seat 40. When the flow rate reaches a predetermines value, the plunger 36 becomes engaged with the valve seat 40, and the fluid flow is then shut off. The valve 10 thus provides means for stopping flow in a fluid distribution system (not shown) if a downstream rupture occurs.

The plunger 36 is preferably designed to form an imperfect seal with the valve seat 40. After fluid flow toward the valve 10 from an upstream source (not shown) has been shut off, fluid will slowly leak through the valve 10, which relieves upstream pressure. When the force of the spring exceeds the residual pressure on the upstream side of the plunger 36, it returns to its open position as shown in FIG. 1.

The plunger 36 may also include a small pressure relief hole 77. After the valve 10 has closed and the problem that caused the excessive flow rate has been remedied, the residual pressure will leak through the pressure relief hole, 77.

The valve 10 permits the fluid distribution downstream from the valve to be repaired without closing an upstream valve (not shown). In a sprinkler irrigation system, for example, a broken riser pipe or broken sprinkler head may be replaced without closing a valve upstream from the valve 10.

The fuse valve 10 may also include a vlave stem stop 68 that limits the range of motion of the plunger 36 away from the valve stem 40. When fluid is flowing through the fuse valve 10, the fluid drag force on the plunger 36 normally will be sufficient to move the valve assembly 32 to the left as shown in FIG. 1 so that the end 58 of the spring 44 contacts the end 60 of the adjusting bolt 26. The valve stem stop 68 prevents the plunger 36 from becoming damaged due to back pressure in the fuse valve 10. The valve stem stop 68 also prevents the valve stem 34 from falling out of the bore 30 when the fuse valve 10 is not in use.

The position of the adjusting bolt 26 in the plug 22 may be used to adjust the tension in the spring 44. The tension should be adjusted so that excessive flow rates seat the plunger 36 against the valve seat 40 while normal flow rates leave the plunger in the open position.

The fuse valve 10 may also include a bleed passage 70 that extends through the housing 12 in the fluid inlet bore 14. A bleed screw 72 is threadedly engaged in the bleed passage 70. After the fuse valve has been actuated to seat the plunger 36 against the valve seat 40, excessive pressure may exist upstream from the plunger 36 even after the broken pipe or the like downstream has been repaired. Loosening the bleed screw 72 relieves the pressure in the fluid inlet bore 14 and allows the force of the spring 44 to move the plunger 36 to its open position as shown in FIG. 1.

A pair of stops 74 and 76 may be mounted near the end 38 of the vave stem 34. The stop 74 and 76 may be fastened to the valve stem in any suitable manner. For example, the end 38 of the valve stem 34 and the stops may be threaded so that the positions of the stop 74 and 76 may be adjusted and so that the plunger 36 may be replaced.

Figure 6:
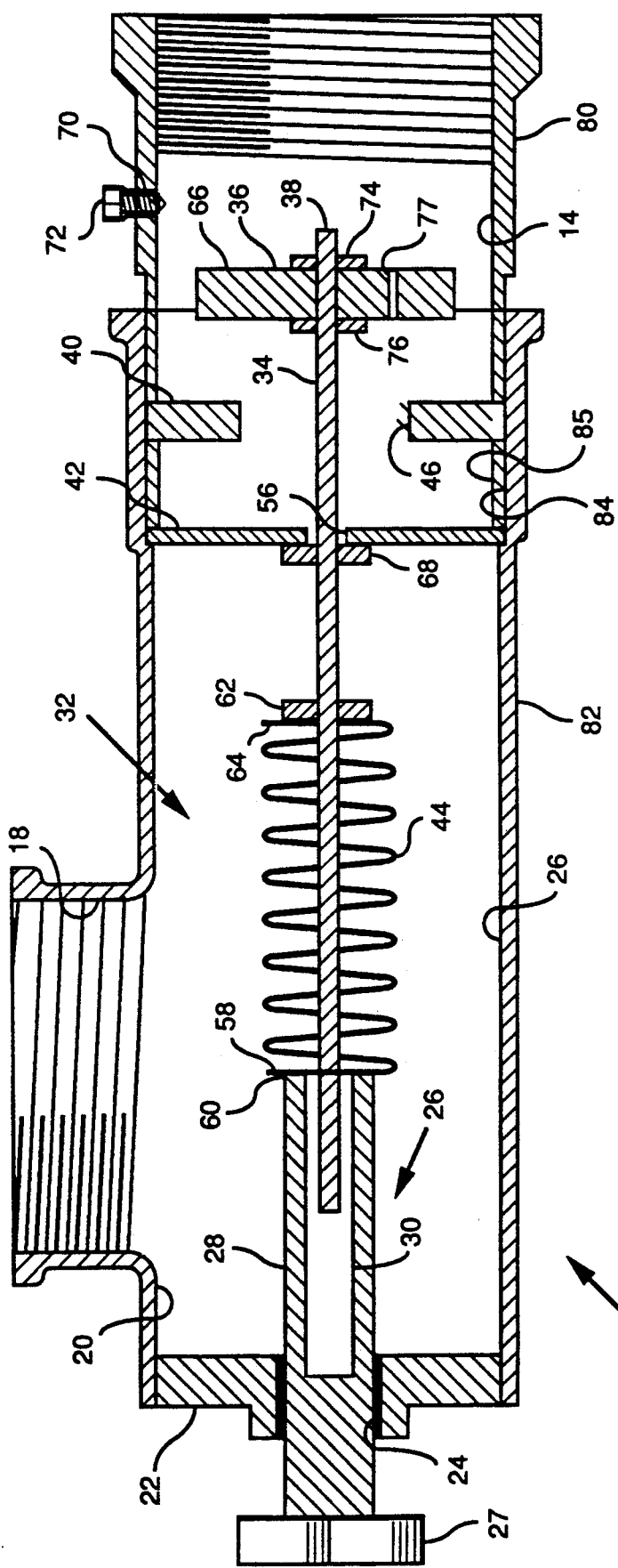
FIG. 6 is a partial cross-sectional view of a second embodiment of a fuse valve according to the present invention.

Referring to FIG. 6, a fuse valve 78 according to the present invention may be formed to have a separate inlet housing 80 and a separate fluid transmission housing 82. The inlet housing 80 and the fluid transmission housing 82 are preferably threadedly engaged. The valve seat 40 and the valve stem guide 42 may be located in a stepped portion 84 of the fluid transmission housing 82. A cylindrical spacer 85 may be placed between the valve stem guide 42 and the valve seat 40.

The fuse valve 78 may be disassembled by removing it from the inlet pipe and removing the stop 74 from the valve stem 34 so that the plunger 36 may be removed from the valve stem 34. The stop 76 may now also be removed from the valve stem 34. The inlet housing 80 and the fluid transmission housing 82 may be disengaged from one another so that the valve seat 40 and the valve stem guide 42 may be removed from the fluid transmission housing 82. The adjusting bolt 26 may be unthreaded from the plug 22.

The fuse valve 78 may then be reassembled by reversing the steps described above for disassembling it. The components of the fuse valve 78 may be cleaned or replaced as necessary before reassembly.

The structures and methods disclosed herein illustrate the principles of the present invention. The invention may be embodied in other specific forms without departing from its spirit or essential characteristics. The described embodiments are to to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fuse valve for use in a fluid distribution system, such as an irrigation system, having a fluid supply pipe upstream from the fuse valve and a fluid distribution pipe system downstream from the fuse valve, the fuse valve being configured to prevent excessive flow rates that occur when there is a break or rupture in the fluid distribution pipe system, comprising:

a housing having an inlet bore configured for connection to the fluid supply pipe an outlet bore configured for connection to the fluid distribution pipe and a fluid transmission bore between the inlet bore and the outlet bore;

a valve assembly mounted in the housing to control fluid flow between the inlet bore and the outlet bore, the valve assembly including:

a valve seat mounted in the housing between the inlet bore and the fluid transmission bore;

a valve stem guide mounted in the housing, the valve stem guide having a plurality of passages for permitting fluid flow therethrough;

a plug mounted in the housing, the plug having a central bore, an adjusting bolt mounted in the central bore in the plug, the adjusting bolt having a hollow shaft portion extending into the bolt from the end of the bolt distal from its head;

a valve stem having a first end that extends into the hollow shaft portion of the bolt and a second end that extends through the valve stem guide and the valve seat, the valve stem guide having a passage aligned with the valve stem so that the valve stem guide and the hollow shaft portion cooperate to hold the valve stem in predetermined alignment relative to the fluid transmission bore;

a plunger mounted to the valve stem upstream from the valve seat;

a stop mounted on the valve stem to limit motion of the valve stem such that the first end of the valve stem is retained within the hollow portion of the adjusting bolt;

a spring retained between the end of the bolt shaft and the stop to bias the plunger away from the valve seat to a normally open position while the fluid flow rate through the valve is less than a predetermined normal rate, the spring being arranged such that a critical fluid flow rate, which might occur in response to a break or rupture in the fluid distribution system, produces a force on the plunger sufficient to move it to a closed position where the plunger contacts the valve seat; and means for automatically relieving fluid pressure upstream from the plunger to allow the spring to return the plunger to the open position after the break or rupture in the fluid distribution system has been repaired and the fluid flow rate will no longer exceed the critical value.

2. The fuse valve of claim 1 further including an inlet housing;

a fluid transmission housing threadedly engagable with the inlet housing;

the fluid transmission housing having a stepped bore portion for receiving the valve stem guide and the valve seat therein, the valve stem guide and the valve seat being arranged in the stepped bore portion so that the valve stem guide and the valve seat are retained in predetermined positions when the inlet housing and the fluid transmission are threadedly engaged; and a spacer mounted in the stepped bore portion between the valve stem guide and the valve seat.

3. The fuse valve of claim 1 including a spring stop mounted to the valve stem and wherein the spring is retained between the spring stop and the end of the bolt.

4. The fuse valve of claim 1 wherein the adjusting bolt is movable in the plug to adjust the bias of the spring.

* * * * *